(12) United States Patent
Akagi (10) Patent No.: US 8,266,261 B2
(45) Date of Patent: Sep. 11, 2012

(54) SERVER SYSTEM, COLLECTIVE SERVER APPARATUS, AND MAC ADDRESS MANAGEMENT METHOD

(75) Inventor: Kenichiro Akagi, Tokyo (JP)

(73) Assignee: NEC Corporation, Tokyo (JP)

( * ) Notice: Subject to any disclaimer, the term of this patent is extended or adjusted under 35 U.S.C. 154(b) by 177 days.

(21) Appl. No.: 12/725,882

(22) Filed: Mar. 17, 2010

(65) Prior Publication Data

US 2010/0250717 A1 Sep. 30, 2010

(30) Foreign Application Priority Data

Mar. 27, 2009 (JP) .................................. 2009-079146

(51) Int. Cl.
*G06F 15/177* (2006.01)
(52) U.S. Cl. ......... 709/221; 370/217; 370/219; 370/351
(58) Field of Classification Search .................. 370/217, 370/219, 351, 389; 709/226
See application file for complete search history.

(56) References Cited

U.S. PATENT DOCUMENTS

| | | | |
|---|---|---|---|
| 6,058,446 A | 5/2000 | Ichimi et al. | |
| 6,393,483 B1 * | 5/2002 | Latif et al. ..................... | 709/226 |
| 7,844,768 B2 | 11/2010 | Tanaka | |
| 7,898,941 B2 * | 3/2011 | Rosenberg et al. ............ | 370/217 |
| 7,990,849 B2 * | 8/2011 | McGee et al. ................. | 370/219 |
| 2006/0153188 A1 * | 7/2006 | Doi et al. ........................ | 370/389 |
| 2008/0205377 A1 * | 8/2008 | Chao et al. ..................... | 370/351 |

FOREIGN PATENT DOCUMENTS

| | | |
|---|---|---|
| JP | 3-110942 | 5/1991 |
| JP | 4-27239 | 1/1992 |
| JP | 8-235084 | 9/1996 |
| JP | 10-65702 | 3/1998 |
| JP | 11-282781 | 10/1999 |
| JP | 2001-268092 | 9/2001 |
| JP | 2004-173315 | 6/2004 |
| JP | 2006-277033 | 10/2006 |
| JP | 2007-020050 | 1/2007 |

OTHER PUBLICATIONS

Japanese Notice of Reasons for Rejection dated Jun. 14, 2011 in corresponding Japanese Application No. 2009-079146 with English translation of Notice of Reasons for Rejection.
Japanese Decision to Grant a Patent dated Jul. 26, 2011 in corresponding Japanese Application No. 2009-079146.

* cited by examiner

*Primary Examiner* — Dustin Nguyen
(74) *Attorney, Agent, or Firm* — Young & Thompson (57) ABSTRACT

Provided is a server system, a collective server apparatus, and a MAC address management method that enables to change a MAC address and a flexible assignment of a MAC address. A server system according to the present invention includes a plurality of network control units that control communication performed with another device via a network, an address storage unit that stores a MAC address to be assigned to the network control unit, an assignment change processing unit that changes an assignment of the MAC address stored in the address storage unit and writes in the address storage unit, and an assignment execution unit that specifies the assignment stored in the address storage unit to each of the network control units.

20 Claims, 9 Drawing Sheets

| SLOT ID | LAN PORT ID | MAC ADDRESS |
|---------|-------------|-------------------|
| 1 | 1 | AA:BB:CC:DD:EE:FF |
| 1 | 2 | AA:BB:CC:DD:EE:GG |
| 2 | 1 | AA:BB:CC:DD:EE:HH |
| 2 | 2 | AA:BB:CC:DD:EE:II |
| ⋮ | ⋮ | ⋮ |

SERVER SYSTEM, COLLECTIVE SERVER APPARATUS, AND MAC ADDRESS MANAGEMENT METHOD

INCORPORATION BY REFERENCE

This application is based upon and claims the benefit of priority from Japanese patent application No. 2009-079146, filed on Mar. 27, 2009, the disclosure of which is incorporated herein in its entirety by reference.

BACKGROUND OF THE INVENTION

1. Technical Field

The present invention relates to a server system, a collective server apparatus, and a MAC address management method.

2. Background Art

In order to operate on a network, such as LAN (Local Area Network), a MAC (Media Access Control) address which is identification information for uniquely identifying a server on the network is assigned to the server. Generally, a MAC address is written in a ROM (Read Only Memory) in a server at the time of factory shipment, and it is not intended to be changed afterward.

Therefore, if the server is replaced due to a failure, for example, or if the operation is switched from the failed server to a standby server, a different MAC address has been used. If a different MAC address is used, the configuration must be changed because other apparatuses (for example access control device and a network storage apparatus) on a network may include the MAC address of the server in the configuration of the devices.

Further, some OS (Operating System, including a driver in this case) or application software that operate on the server may include the MAC address of the server in the configuration of the software. Also in such case, the configuration of the software must be changed. On the other hand, there is a technique suggested that a MAC address written in a ROM in the server is rewritten by a special tool so as to take over the MAC address.

Japanese Unexamined Patent Application Publication No. 2004-173315 (Ichimi et al.) discloses a system provided with a system processing apparatus that is connected to multiple LAN control apparatuses. This system assigns MAC addresses stored in the address storage unit by the system processing apparatus to effective LAN control apparatuses. This system enables to assign the same MAC address at high speed and safely in a case of switching an operation system and a backup system.

Further, Japanese Unexamined Patent Application Publication No. 2007-20050 (Hasegawa) discloses a multiple channel network apparatus provided with multiple slots to insert multiple LAN cards and a control card. This apparatus is provided with a MAC address storage unit that stores a slot ID and a MAC address in advance. Then, at an operation, the control card assigns a MAC address corresponding to the slot ID to a LAN card inserted into the slot.

The present inventor has found a problem that in the system which stores MAC addresses in the ROM in the server, the configuration concerning the MAC address must be changed in the other devices on a network when switching an operation server. Further, there is a problem in a case of replacing a server or switching an operation server, that the configuration concerning the MAC address must be changed in the OS or the application software on the server. The reason for these problems to occur is that the MAC address stored in the ROM in the server is hard to rewrite, thus it is difficult to take over the MAC address after switching the server.

Moreover, even if the ROM is rewritten using a special tool so as to take over the MAC address when replacing a server or switching an operation server, there is a problem that this process requires an effort and time.

In the system disclosed by Ichimi et al., the MAC addresses which should be assigned to each of the multiple LAN controllers are fixed in advance. Further, the apparatus disclosed by Hasegawa previously specifies a pair of the slot ID and the MAC address in the MAC address storage unit, which cannot be changed. Therefore, according to the techniques disclosed by Ichimi et al. and Hasegawa, since the assignment of MAC addresses is fixed, there is a problem that flexible operation cannot be performed.

As the apparatus disclosed by Hasegawa provides the same MAC address to the operation LAN card and the backup LAN card which is in a standby mode, there is a problem that the backup LAN card cannot be accessed via the network.

Additionally, since the apparatus disclosed By Hasegawa previously specifies a pair of the slot ID and the MAC address in the MAC address storage unit, which cannot be changed, there is a problem that the configuration of operation and backup system cannot be specified across multiple apparatuses.

SUMMARY

The present invention is made to solve the above problem, and an exemplary object of the invention is to provide a server system, a collective server apparatus, and a MAC address management method that enable to change a MAC address and assign a MAC address flexibly.

An exemplary aspect of the invention is a server system that includes a plurality of network control units that control communication performed with another device via a network, an address storage unit that stores a MAC address to be assigned in the network control units, an assignment change processing unit that changes an assignment of the MAC address and writes in the address storage unit, where the MAC address is stored in the address storage unit, and an assignment execution unit that specifies the assignment stored in the address storage unit to each of the network control units.

Another exemplary aspect of the invention is a server system that includes a first collective server apparatus including a slot that accommodates a plurality of servers, the plurality of servers including a LAN port control unit for controlling communication performed with another device via LAN, an address-port association management table for storing a slot ID that identifies the slot, a LAN port ID of a server inserted in the slot, and a MAC address to assign to each LAN port, and a management controller that processes in accordance with an assignment change program and an assignment execution program, where the assignment change program changes an assignment of a MAC address stored in the address-port association management table and writes in the address-port association management table, and the assignment execution program specifies the assignment stored in the address-port association management table to each of the LAN port control unit, a second collective server apparatus including slot that accommodates a plurality of servers, the plurality of servers including a LAN port control unit for controlling communication performed with another device via LAN, an address-port association management table for storing a slot ID that identifies the slot, a LAN port ID of a server inserted in the slot, and a MAC address to assign to each LAN port, and a management controller that processes in accordance with an assignment change program and an assignment execution program, the assignment change program changes an assignment of a MAC address stored in the address-port association management table and writes in the address-port association management table, and the assignment execution program specifies the assignment stored in the address-port association management table to each of the LAN port control unit, and a communication path that connects the management controller of the first collective server apparatus and the management controller of the second collective server apparatus to enable communication between them.

An exemplary aspect of the invention is a method of managing a MAC address that includes changing an assignment of a MAC address to a plurality of network control units, writing the changed assignment of the MAC address in an address storage unit, and specifying the assignment stored in the address storage unit to each of the network control units.

The above and other objects, features and advantages of the present invention will become more fully understood from the detailed description given hereinbelow and the accompanying drawings which are given by way of illustration only, and thus are not to be considered as limiting the present invention.

EXEMPLARY EMBODIMENT

Firstly, a basic concept of a server system according to an exemplary embodiment of the present invention is described with reference to FIG. 1. A server system 100 is provided with a control unit 200, an address storage unit 300, and multiple network control units 400. The server system 100 is a network apparatus and, is typically composed of a collective server apparatus that can accommodate multiple servers. The server system 100 is not limited to this but may be composed of a single server.

The control unit 200 is provided with an assignment change processing unit 201 and an assignment execution processing unit 202. The assignment change processing unit 201 performs a change process of a MAC address assignment to each of the network control units 400, and stores the changed assignment in the address storage unit 300. The assignment execution processing unit 202 specifies a MAC address assignment to each network control unit 400, which is stored in the address storage unit 300.

The network control units 400 (401 to 403) perform a connection process with a network. The network control units 400 according to this exemplary embodiment perform communications on a network according to the MAC address assigned by the assignment execution processing unit 202. The network control units 400 are typically a LAN port control unit.

As described so far, in the server system according to this exemplary embodiment, the information concerning the assignment to each network control unit 400 is stored in the address storage unit 300, and the stored assignment information is used to configure each network control unit 400. This facilitates the configuration such as taking over a MAC address, and eliminates the need to change the configuration of MAC addresses in OS and application systems operating on the server system.

Especially, the server system according to the exemplary embodiments of the present invention is provided with the assignment change processing unit 201 that changes MAC addresses to be assigned to each network control unit 400, and the assignment execution processing unit 202 that specifies the changed assignment to each network control unit 400. This produces an exemplary advantage that enables to assign MAC addresses extremely flexibly.

First Exemplary Embodiment

Figure 2:
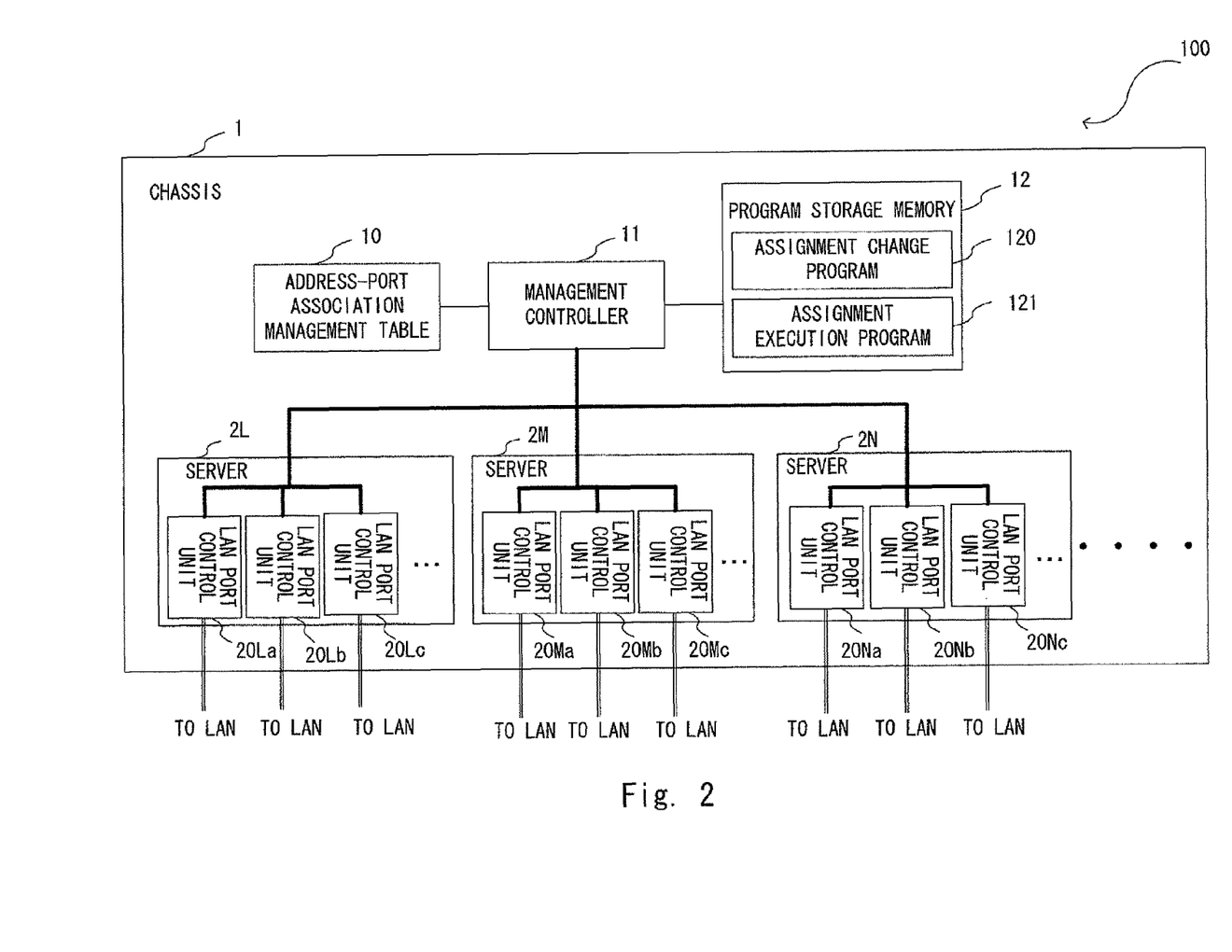
FIG. 2 is a block diagram illustrating the configuration of a server system according to a first exemplary embodiment of the present invention.

First, the configuration of a server system according to the first exemplary embodiment is explained with reference to FIG. 2. A server system 100 is a collective server apparatus that can accommodate multiple servers. The collective server apparatus is a blade server and a rack-mount server, for example.

In a single chassis 1, the server system 100 includes an address-port association management table 10, a management controller 11, a program storage memory 12, and multiple servers 2.

Figure 1:
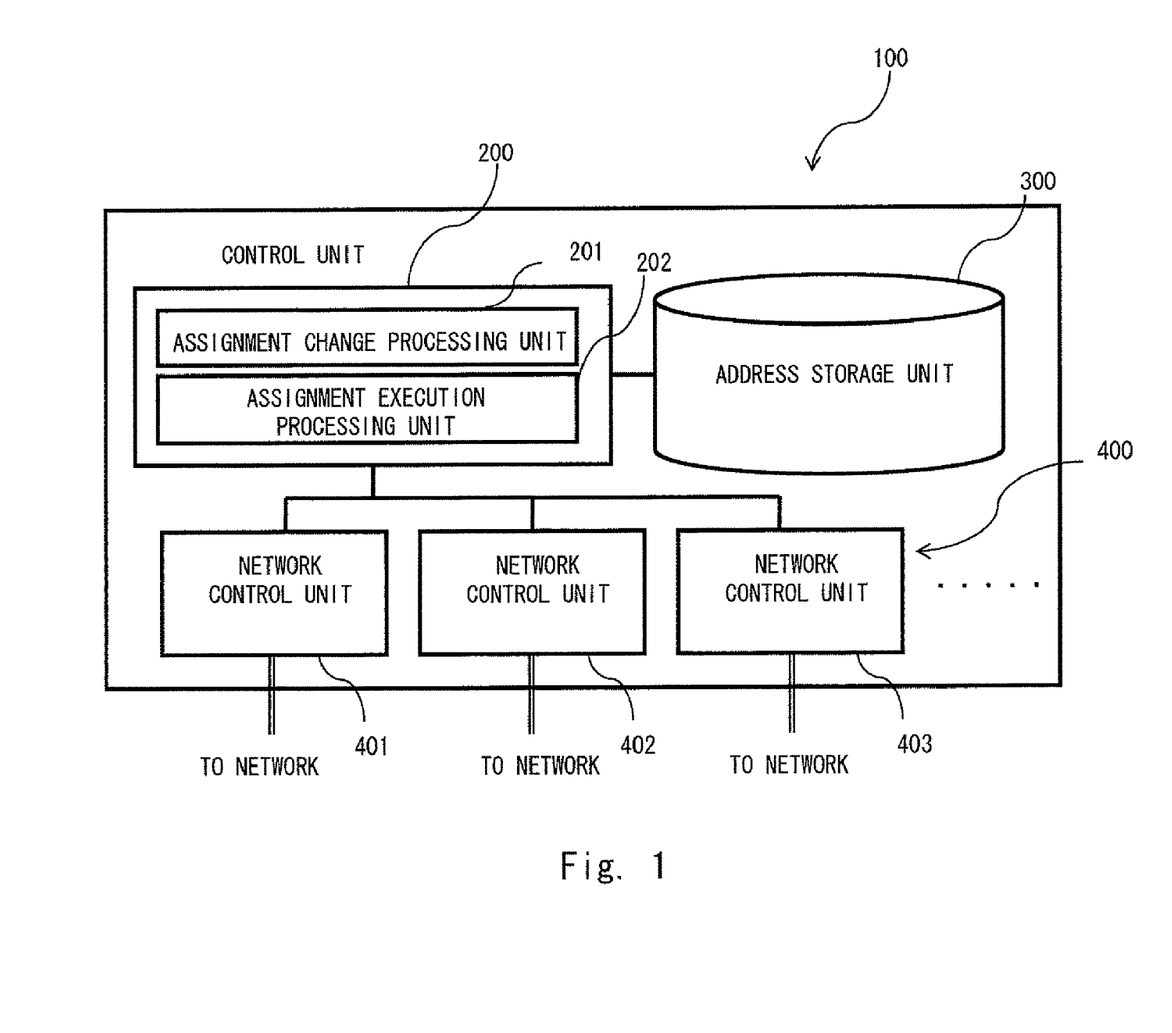
FIG. 1 is a block diagram schematically illustrating the configuration of a server system according to an exemplary embodiment of the present invention.
Figure 4:
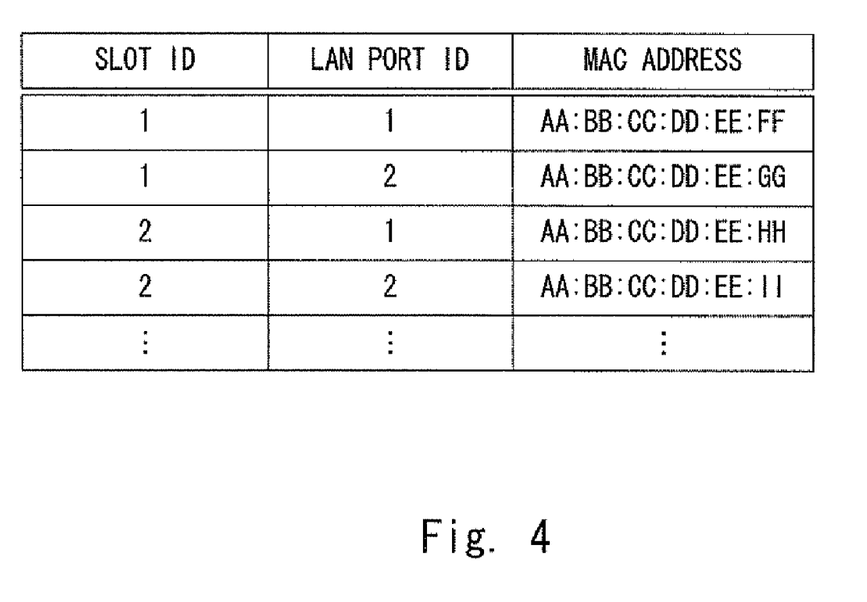
FIG. 4 is a table illustrating the structure of an address-port association management table according to the first exemplary embodiment of the present invention.

The address-port association management table 10 manages assignments of MAC addresses, and is equivalent to the address storage unit 300 in FIG. 1. As illustrated in FIG. 4, the address-port association management table 10 stores a list of slot IDs of servers, LAN port IDs of the servers inserted in the slots, and the MAC addresses assigned to each LAN port.

The management controller 11 performs various kinds of processes in accordance with the program stored in the program storage memory 12. Specifically, the management controller 11 reads the assignment change program 120 and the assignment execution program 121 from the program storage memory 12 to execute them. This management controller 11 is composed of a CPU (Central Processor Unit), ROM, RAM (Random Access Memory), or the like, for example.

The program storage memory 12 stores the assignment change program 120 and the assignment execution program 121.

By the collaboration between the management controller 11 and the assignment change program 120, the assignment change processing unit 201 in FIG. 1 is composed. By the collaboration between the management controller 11 and the assignment execution program 121, the assignment execution processing unit 202 in FIG. 1 is composed.

The assignment change program 120 is software program for executing the process to change the assignment of a MAC address. To be more specific, the management controller 11 that has read the assignment change program 120 determines an assignment of a MAC address to the LAN port control unit 20, in response to a change request of an address assignment that is generated according to a user direction or a status change of the system, and rewrites the address-port association management table 10.

When executing an initialization process, the management controller 11 which has read the assignment change program 120 determines and writes a MAC address corresponding to the combination of each slot ID and each LAN port ID in the address-port association management table 10. The initialization process is performed when the initialization direction of address assignment is received from a user, at a factory shipment, and the power is turned on for the first time, for example. Note that the initialization direction by a user is input to the management controller 11 using the input/output unit, that is connected to the management controller 11.

Further, in response to the initialization direction from the user, the management controller 11 which has read the assignment change program 120 performs the process to confirm that there is no duplication in assignment of the MAC address by the user direction.

The management controller 11 which has read the assignment change program 120 determines the assignment, in a way that there is no duplication in the MAC address among each LAN port control unit 20 in the chassis 1, based on a predetermined policy, if the direction is not the user direction such as at a factory shipment or the power on for the first time. The predetermined policy can be a method, for example, that requests a user to input an address to be a starting point, and assigns MAC addresses without duplication in an ascending order for the expected number, to each slot and each LAN port.

Also in a case of changing the assignment, the management controller 11 which has read the assignment change program 120 writes the change of an address assignment in the address-port association management table 10. The case of changing the assignment is the case of detecting an event to change the address assignment, such as switching from an operation server to a standby server, and an address assignment change by a user direction. At this time, the management controller 11 which has read assignment change program 120 confirms and ensures that there is no duplication in the MAC addresses in a similar way.

The assignment execution program 121 is software program for performing the process to specify a MAC address to each LAN port control unit 20 of each server. To be more specific, the management controller 11 which has read the assignment execution program 121 supplies the assigned MAC address to each LAN port control unit 20 in accordance with the content of the address-port association management table 10.

If the server 2 is newly detected, the management controller 11 which has read the assignment execution program 121 reads each item of the address-port association management table 10, and obtains the information concerning the MAC address of the mounted server.

Further, if the change of the address assignment is executed, the management controller 11 which has read the assignment execution program 121 reads each item of the address-port association management table 10, and obtains the information concerning the MAC address with the changed address assignment.

Then, the management controller 11 which has read assignment execution program 121 assigns the MAC address to each LAN port by writing the MAC address to the memory 201 (FIG. 3) of each LAN port control unit 20 of the server.

The servers 2L, 2M, 2N . . . are inserted into the slots provided to the chassis 1 to operate. Each of the servers 2 is a server computer provided with CPU, ROM, RAM, or the like. Moreover, each of the servers 2 is provided with any number of LAN port control units 20La, 20Lb, 20Lc . . . , 20Ma, 20Mb, and 20Mc . . . 20Na, 20Nb, 20Nc . . . or the like. Each LAN port control unit 20 performs LAN communication using the supplied MAC address.

Figure 3:
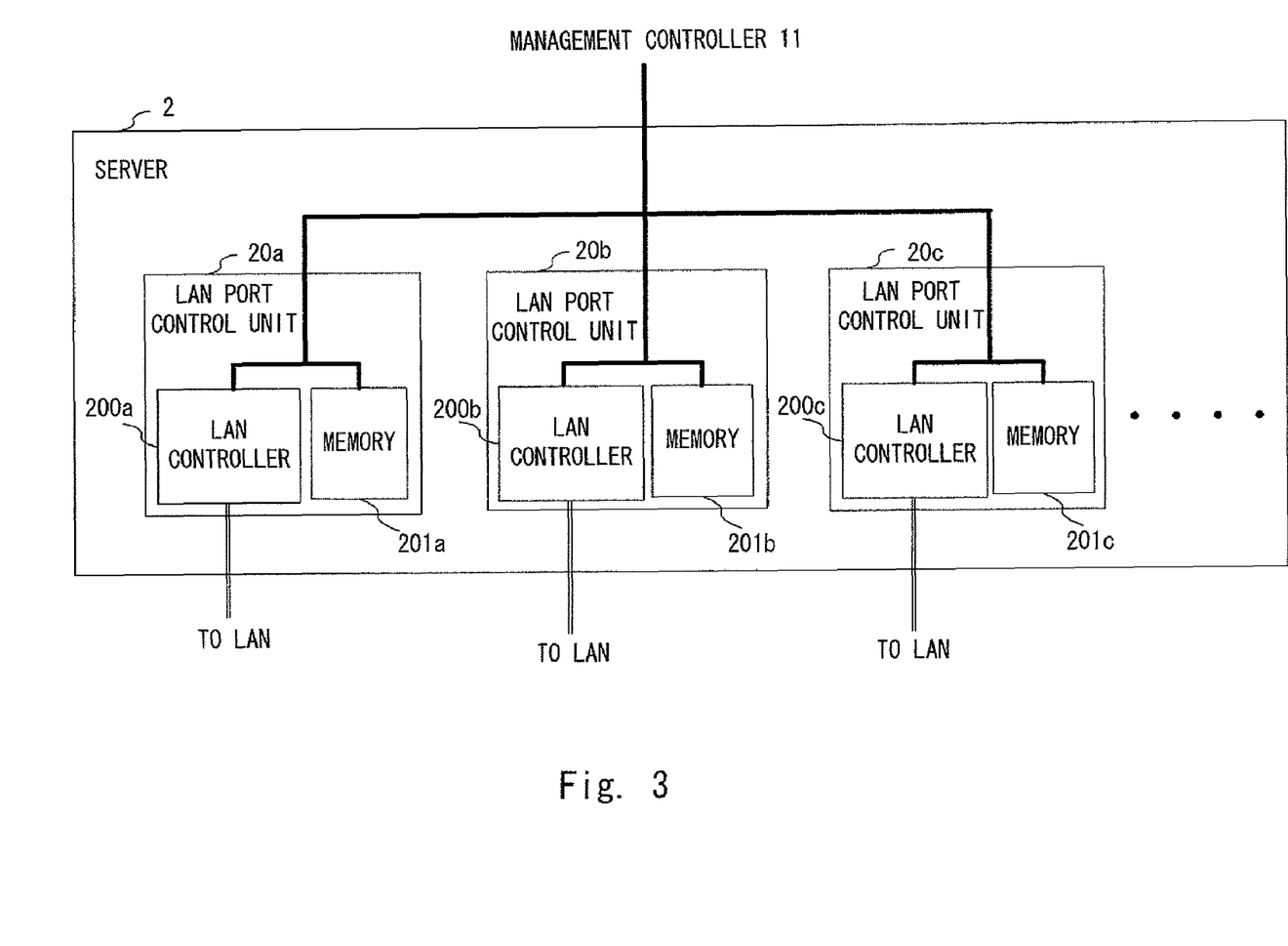
FIG. 3 is a block diagram illustrating the configuration of the server according to the first exemplary embodiment of the present invention.

Referring to FIG. 3, the LAN port control units 20a, 20b, and 20c . . . are respectively provided with LAN controllers 200a, 200b, and 200c . . . and memories 201a, 201b, and 201c. If the management controller 11 which has read assignment execution program 121 assigns a MAC address to the LAN port control unit 20a, the MAC address is written in the memory 201a.

If the LAN controller 200a receives an address reading direction (or reinitialization direction) from the management controller 11 which has read assignment execution program 121, the LAN controller 200a specifies the MAC address in the memory 201a to its own register, uses the MAC address to perform LAN communication. This process is the same for other LAN port control units 20 including the LAN port control units 20b and 20c or the like.

The management controller 11 which has read the assignment execution program 121 also has the function to check the MAC address that is used by the LAN port of the LAN port control unit 20. In this case, the management controller 11 reads the MAC address stored in the register of the LAN port control unit 20. If the MAC address stored in the memory 200 is used to perform LAN communication, the MAC address is stored in the register of the LAN port control unit 20. On the other hand, if the MAC address is stored in the memory 200 but not used for LAN communication, the MAC address is not stored in the register of the LAN port control unit 20. This enables to determine whether the MAC address is used or not by checking the MAC address stored in the register of the LAN port control unit 20.

The management controller 11 which has read the assignment execution program 121 includes the function to check the compatibility between the address-port association management table 10 and the assignment of the MAC address of the register of each LAN port control unit 20. In this case, the management controller 11 compares the assigning MAC address read from the address-port association management table 10 and the MAC addresses of the registers of each LAN port control unit 20, and check whether the assigning MAC address is already used or not.

If the management controller 11 determines that the MAC address to be assigned is not stored in the register of the LAN port control units 20 and the MAC address is not used, the management controller 11 writes the MAC address in the memory 201, and outputs a read direction (or reinitialization direction) to the LAN controller 200. Then the MAC address can be used by the LAN controller 200.

Next, the flow of a process of the server system according this exemplary embodiment is explained in detail with reference to the block diagrams of FIGS. 2 and 3, and the flow-charts of FIGS. 5, 6A, and 6B.

Figure 5:
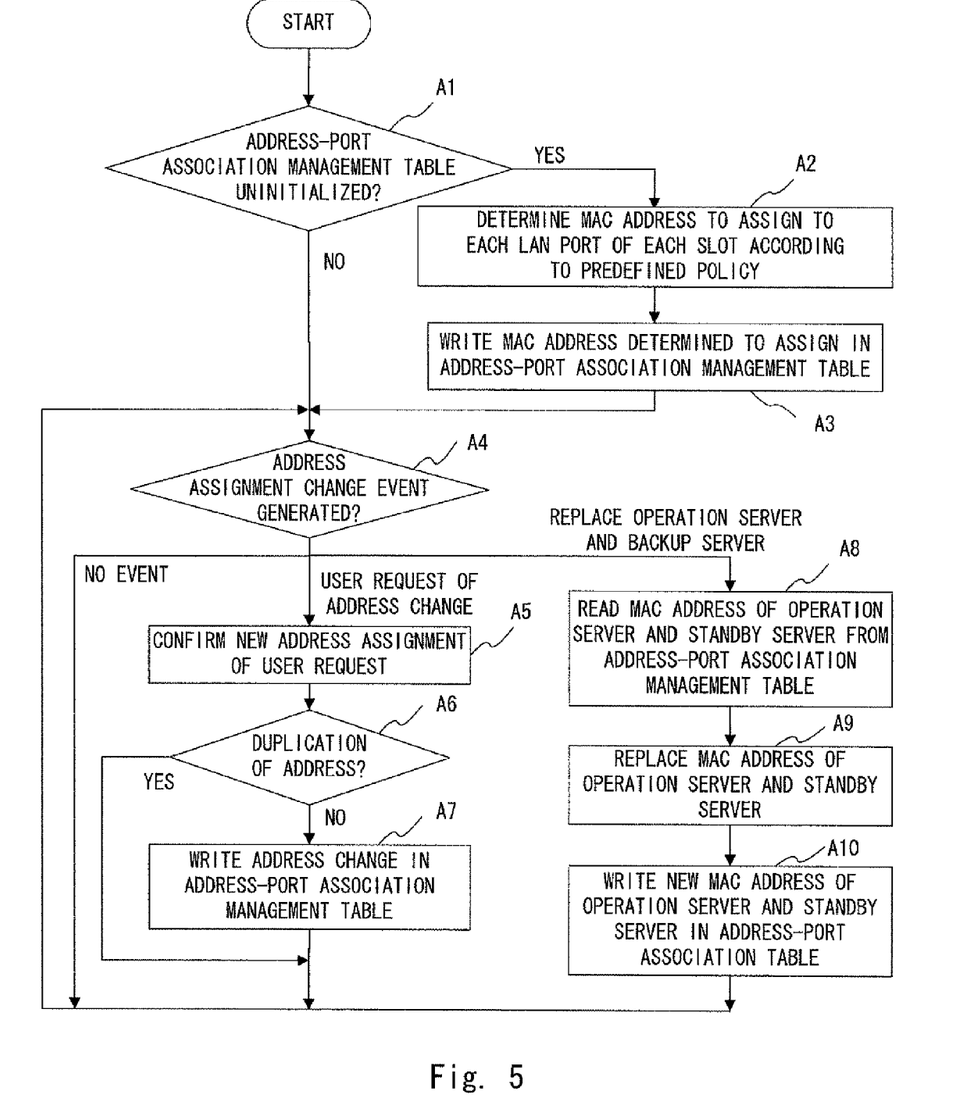
FIG. 5 is a flowchart illustrating the flow of an assignment change process in the server system according to the first exemplary embodiment of the present invention.

The flow of the process of the management controller 11 which has read the assignment change program 120 is illustrated in FIG. 5. The process hereafter explained with reference to FIG. 5 is executed by the management controller 11 which has read the assignment change program 120, but is explained to be executed by merely the management controller 11.

First, the management controller 11 checks whether the address-port association management table 10 is in an uninitialized state (step A1).

If the management controller 11 determined that the address-port association management table 10 in the uninitialized state, the management controller 11 determines the MAC address to assign to each LAN port of each slot in accordance with the policy defined in advance (step A2).

If the assignment of the MAC address is determined, the management controller 11 writes the MAC address that is determined to be assigned in the address-port association management table 10 (step A3).

After the initialization is completed, the management controller 11 waits for a generation of an event of an address assignment change (step A4).

The events of the address assignment change here is a user direction event of an address change, a switching event of an operation server and a standby server, or the like, for example. If the user direction event of the address change is generated, the management controller 11 confirms the content of the new address assignment that is directed by the user (step A5).

If there is a duplication generated in the MAC address provided by the user direction, that is, if the same MAC address is assigned to multiple LAN port control units 20, the management controller 11 discards the direction by displaying an error message, for example (step A6). On the other hand, if there is no duplication in the MAC address provided by the user direction, the management controller 11 writes the change of the address in the address-port association management table 10 (step A7).

If a switching event of an operation server and a standby server is generated due to a failure of the operation server, for example, the management controller 11 reads the MAC addresses of the operation server and the standby server from the address-port association management table 10 (step A8).

The management controller 11 replaces the MAC address of the operation server with that of the standby server (step A9). Then, the management controller 11 writes the new MAC address with a new association in the address-port association management table 10 (step A10).

Since all MAC addresses are replaced in this case, there is no duplication generated in the MAC address.

Figure 6A:
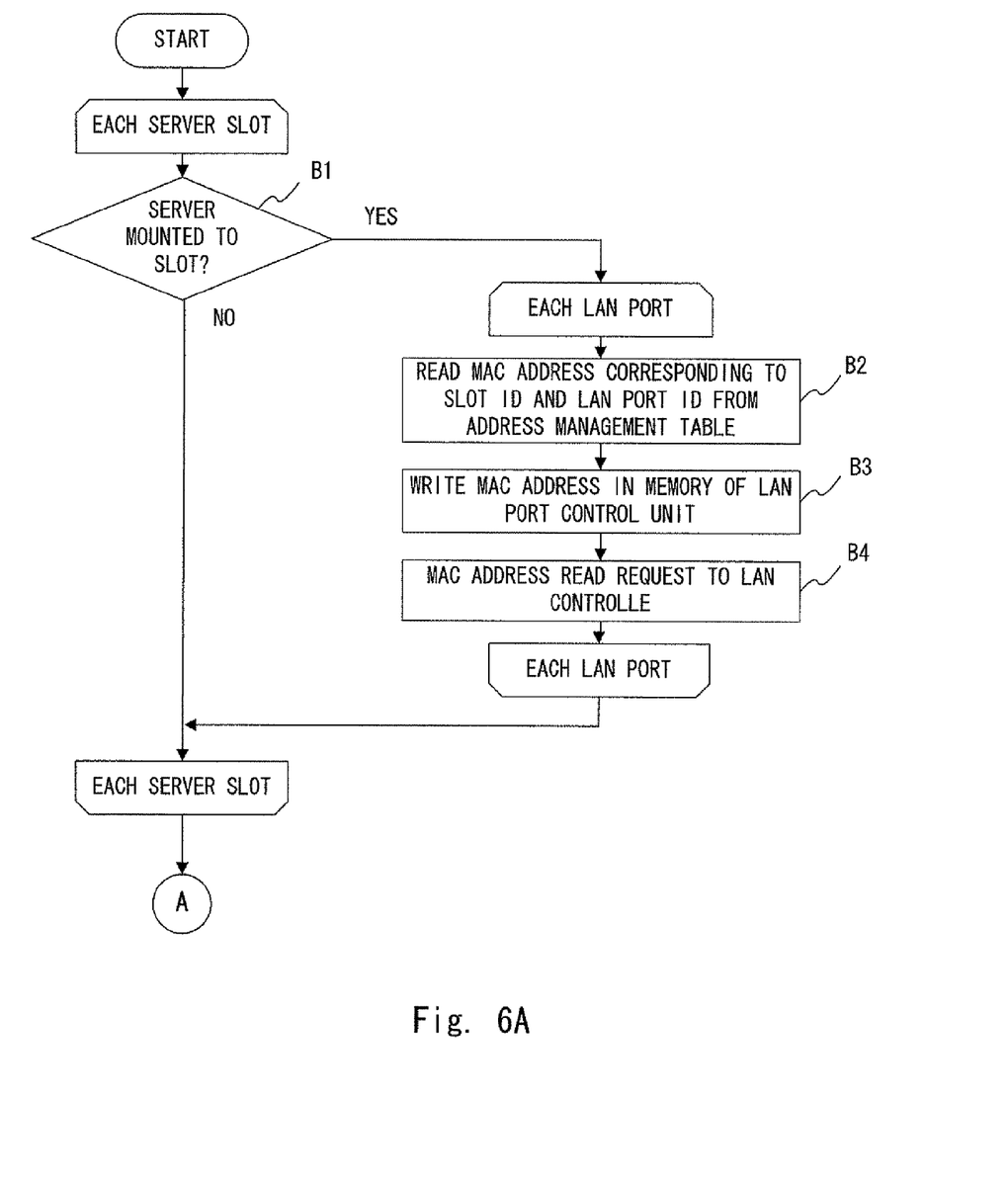
FIG. 6A is a (first half) flowchart illustrating the flow of an assignment execution process in the server system according to the first exemplary embodiment of the present invention.
Figure 6B:
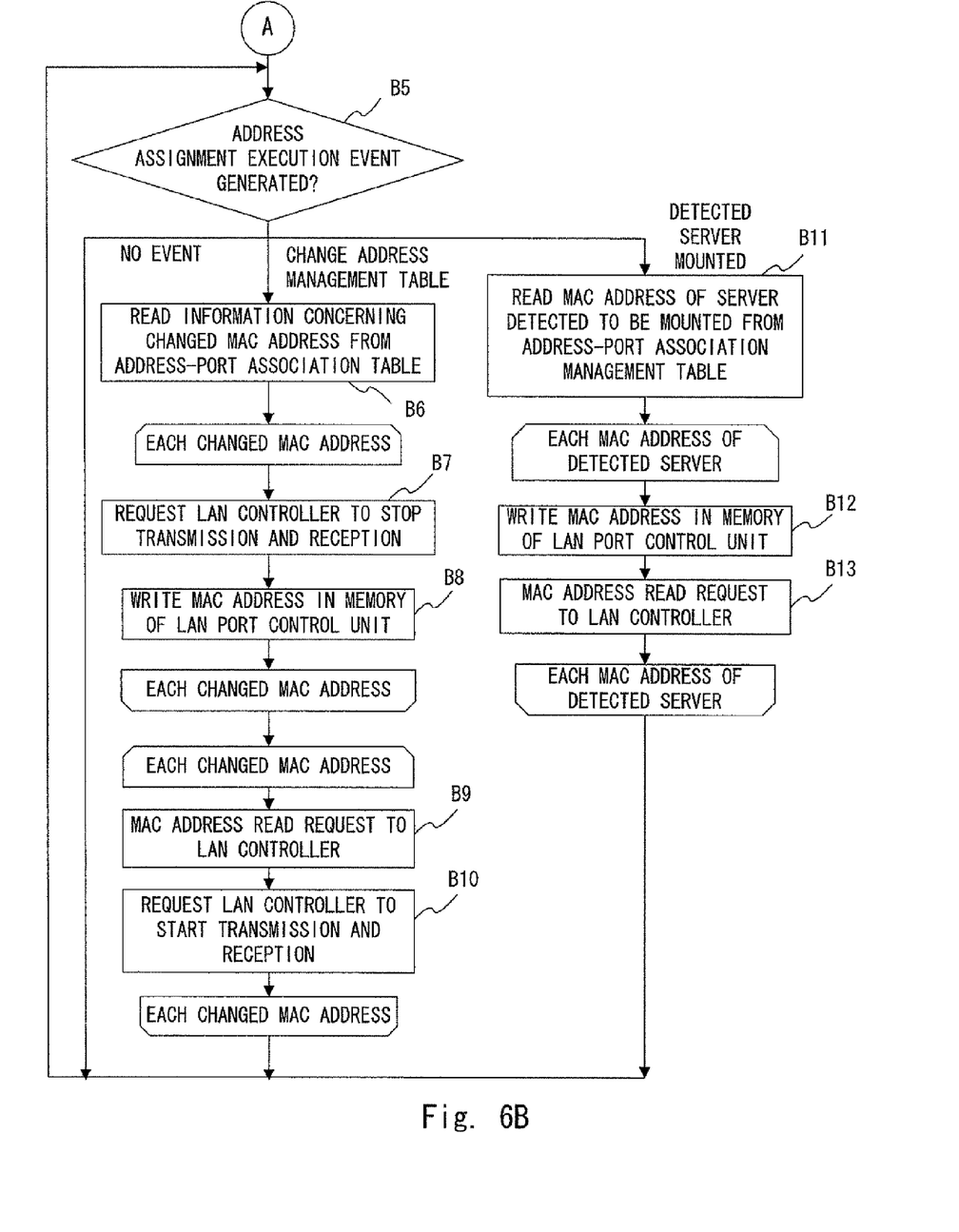
FIG. 6B is a (last half) flowchart illustrating the flow of the assignment execution process in the server system according to the first exemplary embodiment of the present invention.

Next, the flow of the process of the management controller 11 which has read the assignment execution program 121 is illustrated in FIGS. 6A and 6B. The process hereinafter explained with reference to FIGS. 6A and 6B is executed by the management controller 11 which has read the assignment execution program 121, but is explained to be executed by merely the management controller 11.

First, the management controller 11 checks whether the server is mounted in each slot (step B1).

If the management controller 11 determines that the server is mounted, the management controller 11 reads the MAC address corresponding to a slot ID and a LAN port ID from the address-port association management table 10 for each LAN port of the server (step B2).

The management controller 11 writes the MAC address that has been read in the memory 201 of the corresponding LAN port control unit 20 (step B3). The management controller 11 directs the LAN controller 200 to read the MAC address (step B4).

Then, the LAN controller 200 takes out the MAC address from the memory 201, specifies the MAC address to its own register, and starts transmission and reception in LAN. By repeating the steps B2 to B4 to each LAN port of the server, and repeating the steps B1 to B4 to each server slot, MAC addresses are specified to all LAN ports of the servers of all slots.

After the initialization is completed, the management controller 11 waits for a generation of an event of an address assignment execution (step B5).

The events of the address assignment execution here is for example a change event of the address-port association management table 10, and a mounting detection event of a server.

If the change event of the address-port association management table 10 is generated, the management controller 11 reads the information concerning the changed MAC address from the address-port association management table 10 (step B6).

After that, for each of the changed MAC addresses, the management controller 11 directs to stop transmission and reception to the LAN controller 200 of the LAN port control unit 20 having the corresponding LAN port ID, which is on the server with the corresponding slot ID, and writes the MAC address in the memory 201 (step B8).

After the write process, to the corresponding LAN controller 200, the management controller 11 directs to read the MAC address (step B9), and then start transmission and reception (step B10).

If the MAC address is replaced in multiple LAN ports, by suspending the LAN controller 200 once in this way, it is possible to prevent a temporal duplication of the MAC address in the multiple LAN ports.

If the mounting detection event of a server is generated, the management controller 11 reads the MAC address concerning the slot ID of the server, that is detected to be mounted, from the address-port association management table 10 (step B11).

Then, the management controller 11 writes the MAC address in the memory 201 of the LAN port control unit 20 which has the corresponding LAN port ID on the server of the corresponding slot ID, for each MAC address of the server detected to be mounted (step B12). Further, the management controller 11 directs the LAN controller 200 to read the MAC address (step B13).

Accordingly, the LAN controller 200 can start LAN communication with the specified MAC address.

The server system according to the first exemplary embodiment produces the following exemplary advantages.

A first exemplary advantage is that when exchanging the server due to a failure or the like, or when switching the operation from the failed server to the standby server, other devices on the network will not need to change the configuration concerning the MAC address. The reason is that it is possible to take over the MAC address, when exchanging the server or switching the operation system.

A second exemplary advantage is that when exchanging the server due to a failure or the like, or when switching the operation from the failed server to the standby server, OS and application software operating on the server will not need to change the configuration concerning the MAC address. The reason is that it is possible to take over the MAC address, when exchanging the server or switching the operation system.

A third exemplary advantage is that a special tool is not required when taking over a MAC address, and thereby enabling to take over the MAC address in relatively short time. The reason is that the address of the LAN port of the server can be changed easily.

A fourth exemplary advantage is to be able to flexibly determine the roles of the operation and standby servers. The reason is that by the process in accordance with the assignment change program, the relationship between the combination of a slot ID of a server and a LAN port ID in the address-port association management table, and the MAC address can be flexibly changed.

A fifth exemplary advantage is to be able to access the standby server via a network. The reason is that a unique MAC address is also assigned to the standby server, and the MAC address of the operation system and the standby system can be exchanged when requiring to switch the servers.

A sixth exemplary advantage is to be able to switch the operation and standby servers across multiple chassis. The reason is that by the process in accordance with the assignment change program, the relationship between the combination of a slot ID of a server and a LAN port ID in the address-port association management table, and the MAC address can be flexibly changed.

Second Exemplary Embodiment

Figure 7:
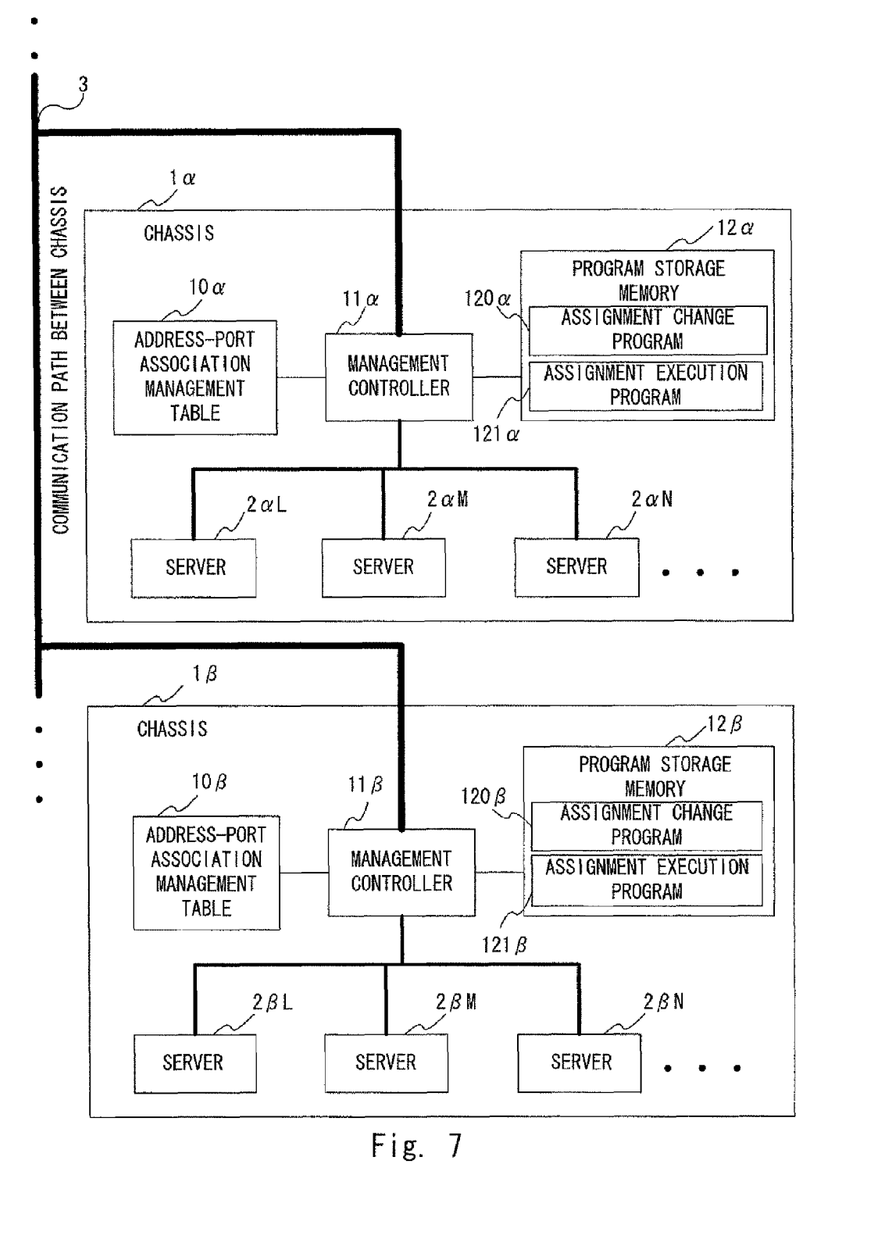
FIG. 7 is a block diagram illustrating the configuration of the server system according to a second exemplary embodiment of the present invention.

The configuration of a server system according to a second exemplary embodiment is explained with reference to FIG. 7. As illustrated in FIG. 7, in addition to the server system according to the first exemplary embodiment illustrated in FIGS. 2 and 3, the server system according to the second exemplary embodiment is further provided with a communication path between chassis 3 that connects a management controller 11α of a chassis 1α, and a management controller 11β of a chassis 1β. Other configuration is basically the same as the configuration illustrated in FIGS. 2 and 3.

The communication path between chassis 3 is composed of a bus and a LAN cable, for example.

If the management controller 11α transmits information to the communication path between chassis 3, the management controller 11β will receive the information from the communication path between chassis 3. On the contrary, if the management controller 11β transmits information to the communication path between chassis 3, the management controller 11α will receive the information from the communication path between chassis 3. The assignment change program 120 which operates by the management controller 11 can use this communication function.

Accordingly, the assignment change program 120α which operates by the management controller 11α can communicate mutually with the assignment change program 120β which operates by the management controller 11β.

Figure 8:
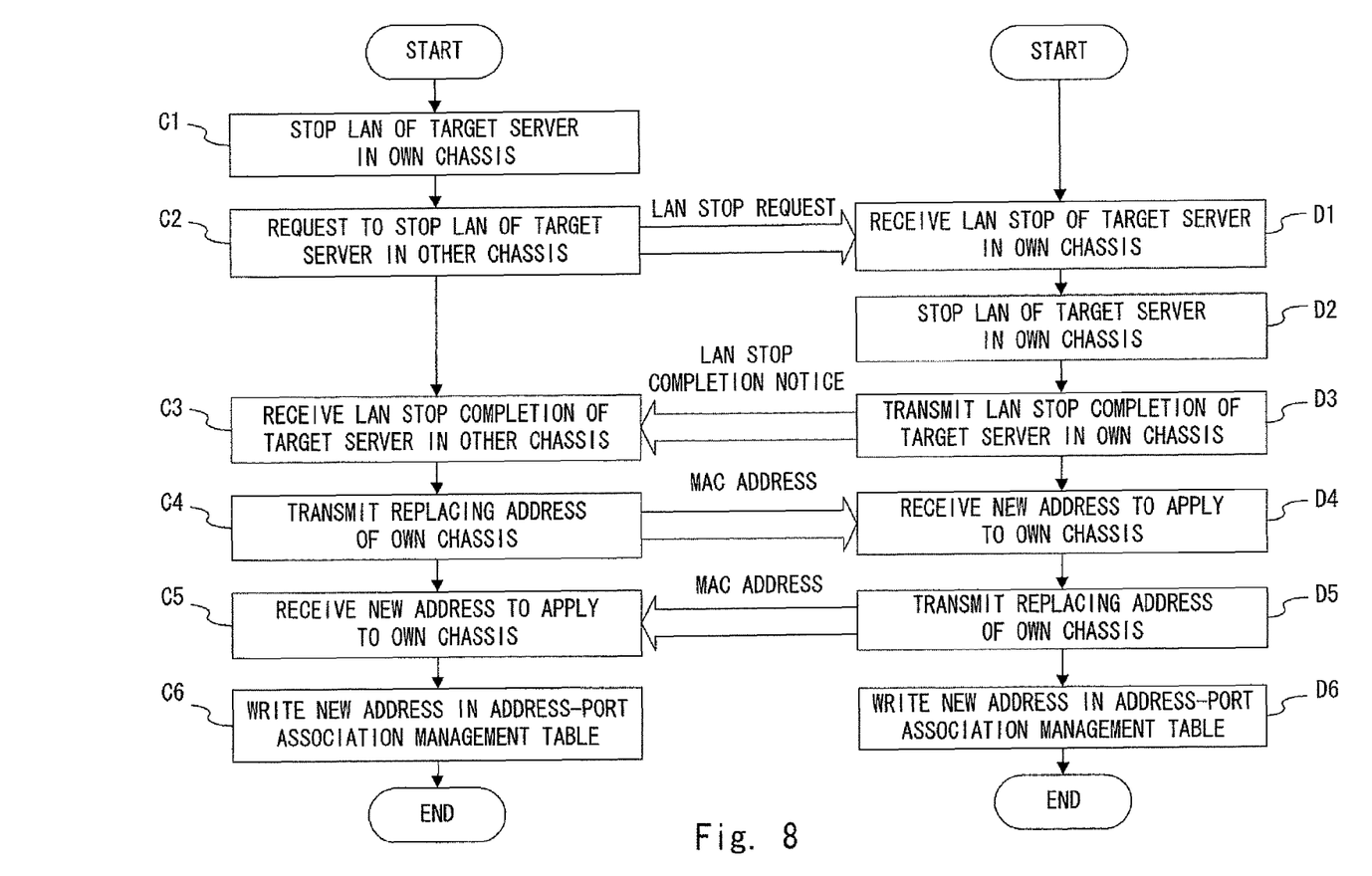
FIG. 8 is a flowchart illustrating the flow of an assignment change process in the server system according to the second exemplary embodiment of the present invention.

The flowchart illustrated in FIG. 8 indicates a part of the flow in the case of replacing the MAC address of the LAN port of two servers across the two chassis. Other operations are equivalent to the flowchart of FIG. 5.

Steps C1 to C6 in the flowchart of FIG. 8 indicate the process flow of the management controller 11α in accordance with the assignment change program 120α. Further, steps D1 to D6 indicate the process flow of the management controller 11β in accordance with the assignment change program 120β. Moreover, arrows between the steps C1 to C6 and the steps D1 to D6 indicate the flow of the information exchanged via the communication path between chassis 3, between the management controller 11α in accordance with the assignment change program 120α and the management controller 11β in accordance with the assignment change program 120β.

If the management controller 11α receives an address change (replace) request across the chassis, the management controller 11α stops the LAN of the server (step C1). The management controller 11α outputs a stop request of LAN to the LAN controller 200 with the address to be changed. The LAN controller 200 which received the stop request of LAN suspends subsequent LAN communication (transmission and reception of data).

If LAN stops, the management controller 11α transmits a stop request of LAN to the assignment change program 120β which operates on the chassis 1β and has an address to be replaced, that is the management controller 11β (step C2).

In response to a reception of the stop request of LAN (step D1), the management controller 11β stops LAN of the server having the address to be changed in the chassis 1β (step D2). If LAN stops, the management controller 11β transmits a notice of LAN stop completion to the assignment change program 120α, that is the management controller 11α (step D3).

In response to a reception of the stop completion of LAN of the other side (step C3), the management controller 11α transmits the MAC address which is to be replaced and has been used by the chassis 1α, that is, the MAC address to be newly used by the chassis 1β (step C4).

If the assignment change program 120β, that is, the management controller 11β, receives this MAC address (step D4), the assignment change program 120β transmits the MAC address to be replaced, which is to be replaced and has been used in the chassis 1β, that is, the MAC address to be newly used by the chassis 1α (step D5).

After the MAC address is transmitted, the management controller 11β in accordance with the assignment change program 120β writes the received new MAC address in the address-port association management table 10β (step D6).

If the management controller 11α in accordance with the assignment change program 120α receives the MAC address to be newly used by the chassis 1α (step C5), the management controller 11α writes the received new MAC address in the address-port association management table 10 (step C6).

After that, the assignment execution program 121α and the assignment execution program 121β operate in each of the chassis, and apply the replaced MAC address to the server. Then transmission and reception in LAN starts with the new replaced MAC address.

As explained above, in addition to the exemplary advantages produced by the first exemplary embodiment of the present invention, the server system of the second exemplary embodiment enables to exchange MAC addresses between chassis.

Other Exemplary Embodiment

Although the MAC addresses are exchanged between different chassis in the second exemplary embodiment, it is not limited to this, but a MAC address may be moved in one way between chassis. For example, the MAC address that is assigned to one chassis is output to the other chassis, and the other chassis transmits and receives in LAN using the MAC address.

The whole or part of the exemplary embodiments disclosed above can be described as, but not limited to, the following supplementary notes.

(Supplementary Note 1)

A server system including: a plurality of network control units that control communication performed with another device via a network; an address storage unit that stores a MAC address to be assigned to the network control units; an assignment change processing unit that changes an assignment of the MAC address and writes in the address storage unit, the MAC address being stored in the address storage unit; and an assignment execution unit that specifies the assignment stored in the address storage unit to each of the network control units.

(Supplementary Note 2)

The server system according to Supplementary note 1, wherein the assignment change processing unit determines the address to be assigned to the network control units and writes in the address storage unit in a case of executing an initialization process.

(Supplementary Note 3)

The server system according to Supplementary notes 1 or 2, wherein the assignment change processing unit includes a function to confirm that there is no duplication in the MAC address assigned to the plurality of network control units, in a case of determining the assignment of the MAC address.

(Supplementary Note 4)

The server system according to any of Supplementary notes 1 to 3, wherein the network control units includes a memory that stores the MAC address assigned to the own network control unit, and the assignment execution processing unit specifies the assignment by writing the MAC address to assign in the memory of the network control units.

(Supplementary Note 5)

The server system according to Supplementary note 4, wherein the assignment execution processing units controls so that communication by the network control unit is stopped before writing the MAC address to assign in the memory.

(Supplementary Note 6)

The server system according to Supplementary notes 4 or 5, wherein the network control units further includes a controller that stores the MAC address to use in the register and executes a communication control, and
the assignment execution processing unit compares the MAC address stored in the register of each of the network control units and the MAC address stored in the address storage unit to determine whether the assigned MAC address is in use or not.

(Supplementary Note 7)

The server system according to any of Supplementary notes 1 to 6, further including a communication path that connects the assignment change processing unit of another server system with the assignment change processing unit of the own server system to enable communication between them, wherein the assignment change processing unit obtains a MAC address via the communication path from the assignment change processing unit of the another server and stores the MAC address in the address storage unit.

(Supplementary Note 8)

The server system according to Supplementary note 7, wherein the assignment change processing unit controls so that the network control units with the MAC address to be changed is in an stopped state before storing the MAC address in the address storage unit.

(Supplementary Note 9)

A server system including: a first collective server apparatus including: a slot that accommodates a plurality of servers, the plurality of servers including a LAN port control unit for controlling communication performed with another device via LAN, an address-port association management table for storing a slot ID that identifies the slot, a LAN port ID of a server inserted in the slot, and a MAC address to assign to each LAN port, and a management controller that processes in accordance with an assignment change program and an assignment execution program, the assignment change program changing an assignment of a MAC address stored in the address-port association management table and writing in the address-port association management table, and the assignment execution program specifying the assignment stored in the address-port association management table to each of the LAN port control unit; a second collective server apparatus including: a slot that accommodates a plurality of servers, the plurality of servers including a LAN port control unit for controlling communication performed with another device via LAN, an address-port association management table for storing a slot ID that identifies the slot, a LAN port ID of a server inserted in the slot, and a MAC address to assign to each LAN port, and a management controller that processes in accordance with an assignment change program and an assignment execution program, the assignment change program changing an assignment of a MAC address stored in the address-port association management table and writing in the address-port association management table, and the assignment execution program specifying the assignment stored in the address-port association management table to each of the LAN port control unit; and a communication path that connects the management controller of the first collective server apparatus and the management controller of the second collective server apparatus to enable communication between them.

(Supplementary Note 10)

The server system according to Supplementary note 9, wherein the management controller of the first collective server apparatus and the management controller of the second collective server apparatus mutually exchange the MAC addresses stored in each of the address-port association management tables via the communication path, and mutually write in the address-port association management tables.

(Supplementary Note 11)

The server system according to Supplementary note 10, wherein each of the management controller of the first collective server apparatus and the management controller of the second collective server apparatus controls the LAN port control with the MAC address to change to be in the stopped state before exchanging the MAC addresses.

(Supplementary Note 12)

The collective server apparatus of the present invention includes a slot that accommodates a plurality of servers, the plurality of servers including a LAN port control unit for controlling communication performed with another device via LAN, an address-port association management table for storing a slot ID that identifies the slot, a LAN port ID of a server inserted in the slot, and a MAC address to assign to each LAN port, and a management controller that processes in accordance with an assignment change program and an assignment execution program, where the assignment change program changes an assignment of a MAC address stored in the address-port association management table and writes in the address-port association management table, and the assignment execution program specifies the assignment stored in the address-port association management table to each of the LAN port control unit.

(Supplementary Note 13)

A method of managing a MAC address including: changing an assignment of a MAC address to a plurality of network control units; writing the changed assignment of the MAC address in an address storage unit; and specifying the assignment stored in the address storage unit to each of the network control units.

(Supplementary Note 14)

The method according to Supplementary note 13, wherein if a user directed the change of the MAC address, the changing the assignment further includes confirming whether the changed MAC address is overlapped with the MAC address assigned to other network control unit.

(Supplementary Note 15)

Another aspect of an embodiment of the present invention is a method of managing a MAC address in a collective server apparatus that is provided with a slot that accommodates multiple servers including a LAN port control unit, and an address-port association management table that stores a slot ID for identifying the slot, a LAN port ID of the server inserted in the slot, and a MAC address to assign to each LAN port, the method including changing an assignment of a MAC address to a plurality of network control units, writing the changed assignment of the MAC address in an address storage unit, and specifying the assignment stored in the address storage unit to each of the network control units.

(Supplementary Note 16)

In a case of switching the operation server and the standby server among the multiple servers, the method of managing a MAC address according to Supplementary note 15 replaces the MAC address, that is stored in the address-port association management table as a MAC address corresponding to the slot ID for accommodating the operation server, and the MAC address, that is stored in the address-port association management table as a MAC address corresponding to the slot ID for accommodating the standby server, and then writes in the address-port association management table.

The present invention provides a server system, a collective server apparatus, and a MAC address management method that enables to change MAC address, and also assigns a MAC address flexibly.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A server system comprising:
    a plurality of network control units that control communication performed with another device via a network, each network control unit being within an apparatus;
    an address storage unit that stores a MAC address to be assigned to the network control units, the address storage unit being within an apparatus;
    an assignment change processing unit that changes an assignment of the MAC address and writes in the address storage unit, the MAC address being stored in the address storage unit, the assignment change processing unit being within an apparatus; and
    an assignment execution unit that specifies the assignment stored in the address storage unit to each of the network control units, the assignment execution unit being within an apparatus, wherein,
    the plurality of network control units comprise an operation network control unit and a standby network control unit,
    the address storage unit stores a MAC address to be assigned to the operation network control unit and a MAC address to be assigned to the standby network control unit in a way that the MAC address to be assigned to the operation network control unit is different from the MAC address to be assigned to the standby network control unit, and
    when switching the operation network control unit and the standby network control unit, the assignment change processing unit switches the MAC address to be assigned to the operation network control unit stored in the address storage unit and the MAC address to be assigned to the standby network control unit stored in the address storage unit to write in the address storage unit.

2. The server system according to claim 1, wherein the assignment change processing unit determines the address to be assigned to the network control units and writes in the address storage unit in a case of executing an initialization process.

3. The server system according to claim 1, wherein the assignment change processing unit includes a function to confirm that there is no duplication in the MAC address assigned to the plurality of network control units, in a case of determining the assignment of the MAC address.

4. The server system according to claim 2, wherein the assignment change processing unit includes a function to confirm that there is no duplication in the MAC address assigned to the plurality of network control units, in a case of determining the assignment of the MAC address.

5. The server system according to claim 1, wherein
    the network control units includes a memory that stores the MAC address assigned to the own network control unit, and
    the assignment execution processing unit specifies the assignment by writing the MAC address to assign in the memory of the network control units.

6. The server system according to claim 2, wherein
    the network control units comprises a memory that stores the MAC address assigned to the own network control unit, and
    the assignment execution processing unit specifies the assignment by writing the MAC address to assign in the memory of the network control units.

7. The server system according to claim 3, wherein
    the network control units comprises a memory that stores the MAC address assigned to the own network control unit, and
    the assignment execution processing unit specifies the assignment by writing the MAC address to assign in the memory of the network control units.

8. The server system according to claim 4, wherein
    the network control units comprises a memory that stores the MAC address assigned to the own network control unit, and
    the assignment execution processing unit specifies the assignment by writing the MAC address to assign in the memory of the network control units.

9. The server system according to claim 5, wherein the assignment execution processing unit controls so that communication by the network control unit is stopped before writing the MAC address to assign in the memory.

10. The server system according to claim 6, wherein the assignment execution processing unit controls so that communication by the network control unit is stopped before writing the MAC address to assign in the memory.

11. The server system according to claim 5, wherein
    the network control units further comprises a controller that stores the MAC address to use in the register and executes a communication control, and
    the assignment execution processing unit compares the MAC address stored in the register of each of the network control units and the MAC address stored in the address storage unit to determine whether the assigned MAC address is in use or not.

12. The server system according to claim 9, wherein
the network control units further comprises a controller that stores the MAC address to use in the register and executes a communication control, and
the assignment execution processing unit compares the MAC address stored in the register of each of the network control units and the MAC address stored in the address storage unit to determine whether the assigned MAC address is in use or not.

13. The server system according to claim 1, further comprising a communication path that connects the assignment change processing unit of another server system with the assignment change processing unit of the own server system to enable communication between them,
wherein the assignment change processing unit obtains a MAC address via the communication path from the assignment change processing unit of the another server and stores the MAC address in the address storage unit.

14. The server system according to claim 13, wherein the assignment change processing unit controls so that the network control units with the MAC address to be changed is in an stopped state before storing the MAC address in the address storage unit.

15. A server system comprising:
a first collective server apparatus including:
a slot that accommodates a plurality of servers, the plurality of servers including a LAN port control unit for controlling communication performed with another device via LAN,
an address-port association management table for storing a slot ID that identifies the slot, a LAN port ID of a server inserted in the slot, and a MAC address to assign to each LAN port, and
a management controller that processes in accordance with an assignment change program and an assignment execution program, the assignment change program changing an assignment of a MAC address stored in the address-port association management table and writing in the address-port association management table, and the assignment execution program specifying the assignment stored in the address-port association management table to each of the LAN port control unit;
a second collective server apparatus including:
a slot that accommodates a plurality of servers, the plurality of servers including a LAN port control unit for controlling communication performed with another device via LAN,
an address-port association management table for storing a slot ID that identifies the slot, a LAN port ID of a server inserted in the slot, and a MAC address to assign to each LAN port, and
a management controller that processes in accordance with an assignment change program and an assignment execution program, the assignment change program changing an assignment of a MAC address stored in the address-port association management table and writing in the address-port association management table, and the assignment execution program specifying the assignment stored in the address-port association management table to each of the LAN port control unit; and
a communication path that connects the management controller of the first collective server apparatus and the management controller of the second collective server apparatus to enable communication between them, wherein,
at least one of the plurality of servers of the first collective server apparatus and the plurality of servers of the second collective server apparatus comprises an operation server, and at least one of the plurality of servers of the first collective server apparatus and the plurality of servers of the second collective server apparatus comprises a standby server,
the address-port association management table stores a MAC address corresponding to a slot ID accommodating the operation server and a MAC address corresponding to a slot ID accommodating the standby server in a way that the MAC address corresponding to the slot ID accommodating the operation server is different from the MAC address corresponding to the slot ID accommodating the standby server,
when switching the operation server and the standby server, the management controller switches the MAC address stored in the address port association management table as the MAC address corresponding to the slot ID accommodating the operation server, and the MAC address stored in the address port association management table as the MAC address corresponding to the slot ID accommodating the standby server to write in the address-port association management table.

16. The server system according to claim 15, wherein,
the plurality of servers of the first collective server apparatus comprises an operation server,
the plurality of servers of the second collective server apparatus comprises a standby server, and
the management controller of the first collective server apparatus and the management controller of the second collective server apparatus mutually exchange the MAC address corresponding to the slot ID accommodating the operation server and the MAC address corresponding to the slot ID accommodating the standby server, the MAC addresses being stored in each of the address-port association management tables via the communication path, and mutually write in the address-port association management tables.

17. The server system according to claim 16, wherein each of the management controller of the first collective server apparatus and the management controller of the second collective server apparatus controls the LAN port control with the MAC address to change to be in the stopped state before exchanging the MAC addresses.

18. A method of managing a MAC address in a collective server that comprises an address storage unit, the address storage unit storing MAC addresses to be assigned to a plurality of network control units comprising an operation network control unit and a standby network control unit in a way that a MAC address to be assigned to the operation network control unit is different from a MAC address to be assigned to the standby network control unit, the method comprising:
changing an assignment of a MAC address to a plurality of network control units;
writing the changed assignment of the MAC address in an address storage unit; and
specifying the assignment stored in the address storage unit to each of the network control units, wherein,
when switching the operation network control unit and the standby network control unit, the MAC address to be assigned to the operation network control unit stored in the address storage unit and the MAC address to be assigned to the standby network control unit stored in the address storage unit are switched in the step of changing the assignment, and
the MAC address that is switched is written in the writing step.

19. The method according to claim 18, wherein if a user directed the change of the MAC address, the changing the assignment further comprises confirming whether the changed MAC address is overlapped with the MAC address assigned to other network control unit.

20. The server system according to claim 1, further comprising:
 a slot that accommodates a plurality of servers comprising an operation server and a standby server, the operation server including the operation network control unit and the standby server including the standby network control unit,
 wherein, when switching the operation server and the standby server the assignment change processing unit switches the operation network control unit and the standby network control unit.

* * * * *